Feb. 8, 1966

A. GASSER 3,233,959

CAMERA FOR SUCCESIVELY EXPOSING A FILM IN
PARALLEL COMPONENT STRIPS

Filed Feb. 9, 1962

Inventor:
Adolf Gasser

Feb. 8, 1966  A. GASSER  3,233,959
CAMERA FOR SUCCESIVELY EXPOSING A FILM IN
PARALLEL COMPONENT STRIPS
Filed Feb. 9, 1962  3 Sheets-Sheet 2
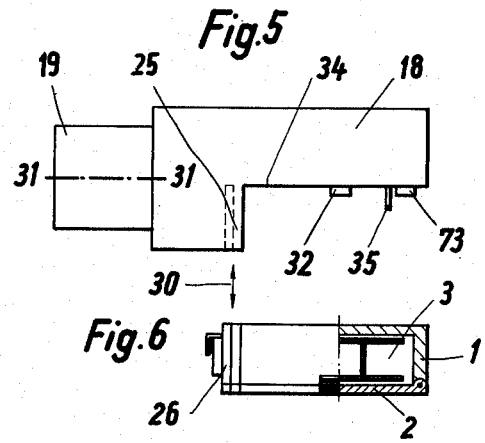
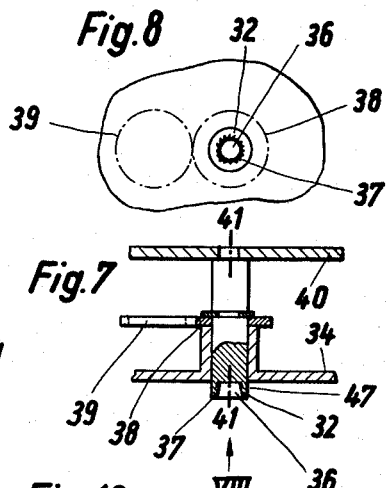
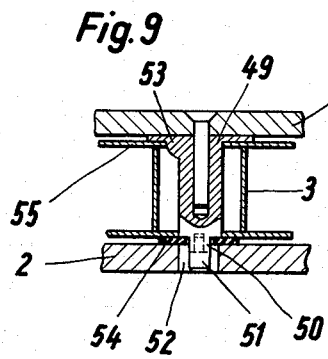
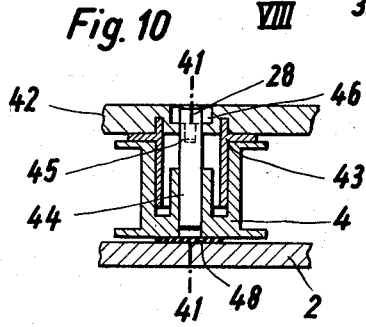
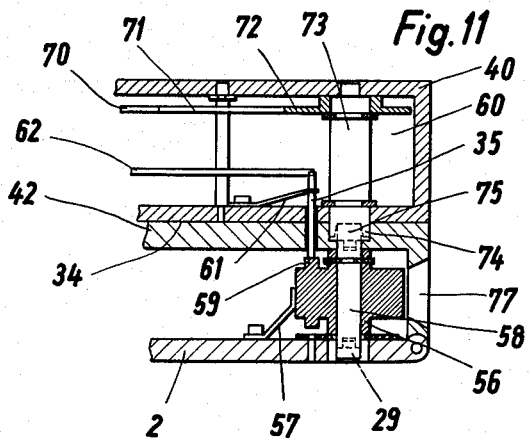
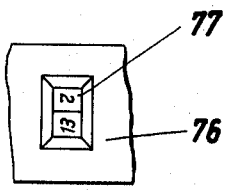
Inventor:
Adolf Gasser Feb. 8, 1966     A. GASSER     3,233,959
CAMERA FOR SUCCESIVELY EXPOSING A FILM IN
PARALLEL COMPONENT STRIPS
Filed Feb. 9, 1962     3 Sheets-Sheet 3
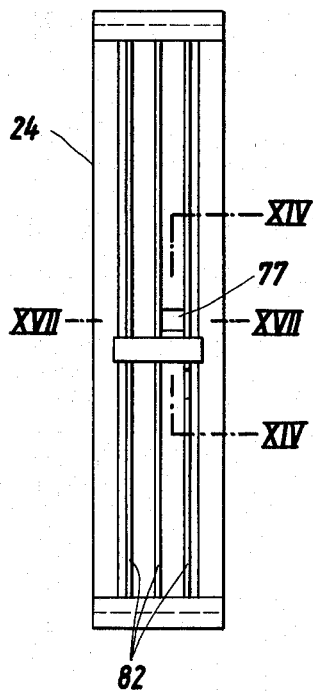
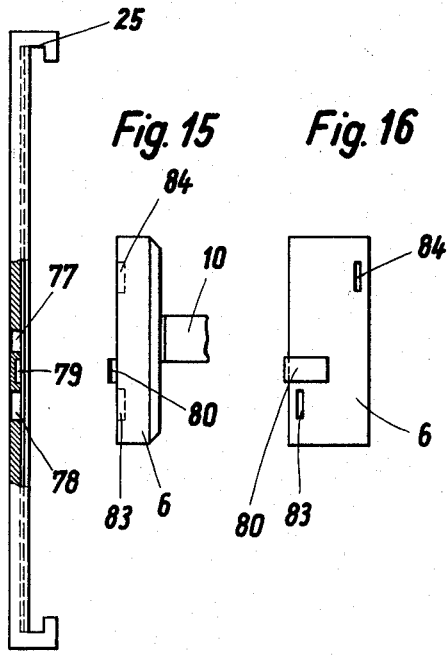
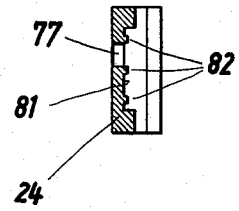
Inventor:
Adolf Gasser

United States Patent Office 3,233,959
Patented Feb. 8, 1966

3,233,959
CAMERA FOR SUCCESSIVELY EXPOSING A FILM IN PARALLEL COMPONENT STRIPS
Adolf Gasser, Triesen, Liechtenstein, assignor, by mesne assignments, to Argus Incorporated, Chicago, Ill., a corporation of Delaware
Filed Feb. 9, 1962, Ser. No. 172,350
Claims priority, application Austria, Feb. 11, 1961, A 1,151/61
6 Claims. (Cl. 352—77)

This invention relates to movie cameras. Some, but not all of the features of the invention deal with a camera for successively exposing a film in parallel component strips which are arranged in true order with regard to succession, image-position, perforation and projection and combined in a single picture strip before the reproduction. In this camera, a reversing drive chamber is preferably provided for accommodating the spools, drive members therefor and preferably a film pressure plate, which chamber can be separated from the remaining camera body including the optical system, shutter and remaining drive members and can be moved to different positions relative to the camera body so as to change the strips to be exposed and their direction, and can be replaced and lighttightly connected back to the camera body. The chamber may form an outer boundary of the camera at least adjacent to indicating devices for the component strip of film in position for exposure and for film lengths which have been exposed or are available for exposure. The aforementioned chamber preferably forms a complete film magazine. The camera body includes a control means for stopping automatically the feed of the film in the magazine when the end of the film has been exposed. To this end, a feed control member is provided on the camera body which moves from a reference position (when a fresh roll of film is in the magazine) with the feeding of the film. The feed control member stops the feed of the film when it moves into a position indicating that the end of the film strip has been exposed.

The present invention relates to a means on the magazine which automatically adjusts the position of the feed control member in accordance with the length of the film which has previously been exposed in the magazine. Thus, a magazine can be removed prior to being fully exposed, and the same or a different magazine with partially exposed film may be positioned subsequently on the camera body without any further adjustments required, since the control member referred to automatically will be repositioned to accommodate the film in the magazine involved.

The above and other advantages and features of the invention will become apparent upon making reference to the specification to follow, the claims and drawings wherein:

FIG. 5 is a top plan view showing the camera body.

FIG. 6 shows the associated reversing drive chamber associated with a camera body as shown in FIG. 5. This chamber is shown in a top plan view from above in the left-hand part and in a horizontal sectional view in the right-hand part.

FIG. 7 is a sectional view taken in line VII—VII of FIG. 3 and showing a part of the camera body.

FIG. 8 is an end view taken in the direction of the arrow VIII in FIG. 7.

FIG. 9 shows the reversing drive chamber of FIG. 1 in a horizontal sectional view taken on line IX—IX.

FIG. 10 is a horizontal sectional view taken on line X—X in FIG. 1.

FIG. 11 shows the reversing drive chamber and the adjoining part of the camera body in a horizontal sectional view taken on line XI—XI in FIGS. 1 and 3.

FIG. 12 is a top plan view of the rear boundary wall of the reversing drive chamber.

FIG. 13 is an enlarged top plan view showing the film guide of the camera body.

FIG. 14 shows the film guide partly in a side elevation and partly in a longitudinal sectional view taken on line XIV—XIV of FIG. 13.

FIG. 15 is a side elevation showing the film pressure plate.

FIG. 16 is a top plan view thereof.

FIG. 17 shows the film guide in a horizontal sectional view taken on line XVII—XVII in FIG. 13.

Figure 1:
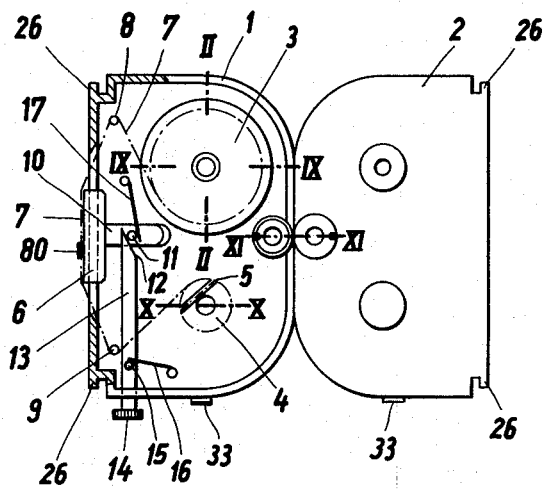
FIG. 1 is a top plan view showing the open reversing drive chamber according to the present invention.
Figure 2:
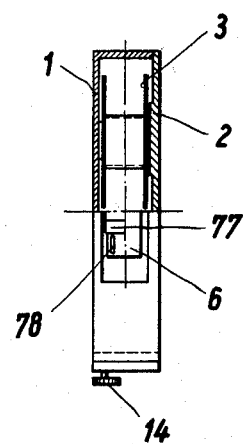
FIG. 2 illustrates in its upper part a sectional view taken on line II—II of FIG. 1 and in its lower part a top plan view.

In FIG. 1, the reversing drive chamber has a housing 1 and a hinged cover 2. 3 is a supply spool and 4 is a stub spool, slotted at 5, for temporarily taking up the film. 6 is a film pressure plate, which is engaged by the film 7, which comes from the supply spool 3 and is guided by a deflecting roller 8. Another deflecting roller 9 deflects the film 7 to the stub spool 4, 5. The film pressure plate 6 is guided by the straps 10, which carry a pin 11, which is controlled by the bevelled end 12 of a pin 13, which is longitudinally movable by a button 14. The pin 13 carries a stop 15, which engages the spring 16. Another spring 17 ensures a constant engagement of the pin 11 with the bevelled face 12. A movement of the button 14 toward the reversing drive chamber will thus cause the film pressure face 6 to be retracted into the reversing drive chamber whereas the spring 17 causes this face to assume the position shown in FIG. 1 when the pin 14 is not actuated. Means 33 are locking members, by which the cover 2 can be locked with the housing 1 of the reversing drive chamber.

Figure 3:
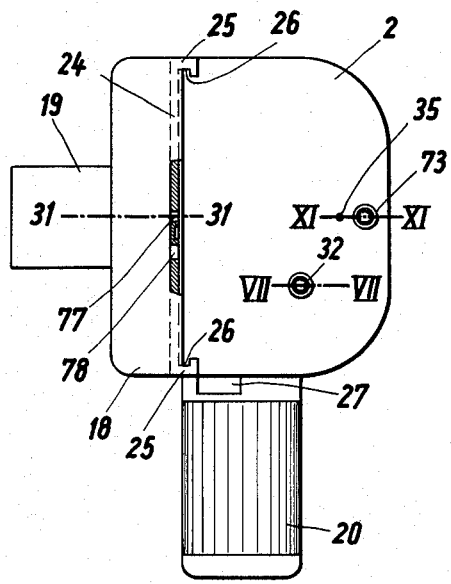
FIG. 3 shows the camera viewed from the side before the reversing drive chamber was introduced.
Figure 4:
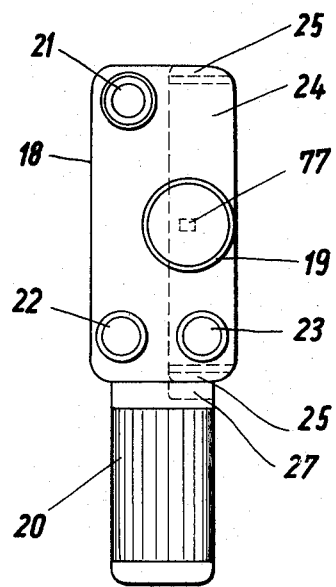
FIG. 4 is a front elevation.

FIGS. 3 and 4 show the camera body 18 with the lens 19 and handle 20. The latter accommodates either a spring drive for the feed mechanism of the camera or a motor drive. 21 is the eyepiece of the viewfinder whereas 22 is the lens arranged before the light-sensitive cell for the diaphragm control. 23 is an adjusting member for the camera. FIG. 3 shows the camera body from which the reversing drive chamber has been removed. It is apparent that that transverse wall 24 of the camera body 18 which constitutes the film guide forms undercut guides 25 for lighttightly guiding the ledgelike extension 26 of the reversing drive chamber (FIG. 1). 27 is an opening in the camera body 18 (FIG. 4). This opening serves to receive the actuating button 14 for the film pressure plate 6 when the reversing drive chamber 1, 2 is in its operating position.

FIGS. 5 and 6 show how the reversing drive chamber is moved into and out of the camera. This is effected in the direction of the arrow 30 at right angles to the optical axis 31—31 of the lens 19 and at right angles to the direction of movement of the film 7 (FIG. 1). The drive pins 32, 73 of the camera body 18 are shown to protrude over that wall 34 of the camera body which faces the reversing drive chamber 1, 2. A pin 35 is also apparent, the significance of which will be explained hereinafter. FIG. 7 shows the design of the drive pin 32 in detail. This pin has an opening 36 having the shape of a hollow frustum of a cone having a periphery ribbed at 37. The pin carries a drive gear 38, which is in mesh with another drive gear 39. Because a friction drive must be provided and those parts of the drive which act on the take-up stub spool 4 and which lie between the coupling members 32, 36, 37 and the stub spool 4 cannot yield when transmitting forces, it is necessary either to frictionally couple the gear 38 to the drive pin 32 or to provide for such a frictional connection between the gear 39 and the shaft which drives this gear, unless the frictional coupling is provided even closer to the drive motor or the spring of the drive. That wall which is opposite to the wall 34 of the camera body and serves for mounting the pin 32 is indicated at 40. FIG. 10 shows the reversing drive chamber in a sectional view which corresponds to FIG. 7, which is a sectional view of the camera body. Hence, the axis of rotation 41—41 of the pin 32 is identical with the axis of rotation 41—41 of the stub spool 4 shown in FIG. 10. 42 indicates that wall of the reversing drive chamber which is opposite to the cover 2. Pressed into this wall 42 is a bushing 43, on which the stub spool 4 is rotatable. The stub spool 4 carries a drive pin 44, which receives after an extension 45 the plug or mandrel 28, which consists of rubber. It is surrounded by a blind hole 46, which receives the rim portion 47 as far as it is disposed in the drive pin 32 between its outer periphery and the inner opening 36. A disc 48 on the cover 2 engages the stub spool 4 to form an abutment for it.

Whereas the drive for the supply spool 3 is similar, as is shown in FIG. 9, the wall 42 carries the driver 49, which receives the rubber mandrel 51 after an extension 50. There is also an opening 52 to receive the rim portion of a drive pin, not shown. This drive pin has the design which has been described for the drive pin 32. A nose 53 of the driver 49 engages a corresponding opening of the supply spool 3 to drive the same. The felt disc 54 is adhesively connected to the cover 2 to prevent a penetration of light through the opening 52. The opening 52 must have the size required to enable the opening and closing of the cover.

The drive for the counter has a corresponding design, as is shown in FIG. 11. To prevent wrong indications by a run-out movement of the counter drum 56, the latter is engaged by a brake spring 57. The drum 56 is also driven by a pin 58, which is coupled by the mandrel 29 consisting of resilient substances to the drive pin of the camera body. The counter drum has an engaging cam 59, which cooperates with the pin 35 mentioned in connection with FIG. 5. As soon as the drum 56 has reached a position in which a full component strip of film has been exposed, the pin 35 comes under the influence of the cam 59 and is advanced towards the interior 60 of the camera body against the action of spring 61. By the forward movement towards 60, the pin 35 enters the range of the stop disc 62 so that the entire drive mechanism is arrested. When the parts are in the position shown in FIG. 11, the drive is effected by the gear 70. This meshes by means of the gear 71 with the gear 72, by means of which the drive pin 73 is moved. As has been explained in connection with the drive pin 32, the drive pin 73 has also an opening 74 to receive the rubber mandrel 75, which is firmly connected to the pin 58 by means of an opening in the latter. FIG. 12 shows the rear narrow wall of the reversing drive chamber 76. The wall has an aperture 77, above which the inscriptions on the counter drum 56 are apparent. The inscriptions consist of two mutually oppositely arranged series of numerals. Only that numeral is readable in normal position which indicates the exposed lengths of the film strip which is just in position for exposure. In this arrangement the numerals of the other film strip are inverted so that it is apparent that this film strip is not in position for exposure.

FIGS. 13 to 17 show details of the design of the film guide 24 and the pressure plate 6. 77 is the picture gate. The claw for feeding the film extends through an aperture 78. The aperture 79 facing the film receives a claw 80, which is secured to the film pressure plate 6. When the film pressure plate 6 is retracted by actuation of the button 14, the claw 80 will cause the film to move with it and to leave the opening 81, in which it is in position for exposure. As a result, the film will not be damaged when the reversing drive chamber is moved out of the camera body. The film is guided in engagement with the narrow ledges 82. The recess 83 is provided to ensure that the tip of the feed claw cannot push back the film pressure plate. When the reversing drive chamber is in its inverted position, the recess 84 will be in the position of the recess 83.

FIGS. 5 to 12 indicate that the pin 73 serves always for driving the counter drum irrespective of the position of the reversing drive chamber. This is different with the drive pin 32, which drives the stub spool 4 in one position of the reversing drive chamber and the supply spool 3 in the other, when the film is being wound back. When the cover 2 engages the body wall 34, its movability will not be restricted because individual coupling members consist of resilient materials, as has been described.

What is claimed is:

1. A motion picture camera comprising: a camera body for receiving a film magazine, said camera body including an optical system having an optical axis along which the light rays to be exposed are focused on the film in the magazine and feed mechanism for imparting movement to the film in the magazine; a film magazine removably attached to said camera body in either of two mutually inverted positions of said magazine, said magazine comprising a casing including a front film-receiving wall along which the section of film to be exposed passes and parallel side walls extending generally transverse to said front wall, one of said side walls being hinged to the rest of the casing to form a cover for the casing, and a pair of shafts extending transverse to said side walls for respectively rotatably supporting a supply reel and take-reel; said camera body further having a first boundary surface at right angles to said optical axis and which surface confronts said front film-receiving wall of said magazine casing, a second boundary surface extending substantially transverse to said first boundary surface and which confronts one of said side walls of said magazine, a picture gate at said first boundary surface which controls the exposure of the film on each of two component strips thereof spaced across the width of the film for said two positions of said magazine and coupling means at said second boundary surface driven by said feed mechanism for driving said shafts of said magazine; said side walls of said magazine having rotary coupling means which engage with said coupling means at said second boundary surfaces of said camera body for interconnecting the latter coupling means with a different one of said magazine shafts in the two mutually inverted positions of said magazine where the front film-receiving wall thereof is opposite said first boundary surface of said camera body; an exposed film length indicating device in said magazine for indicating the component strip and the exposed length of the component strip which is in position for exposure, said indicating device having a pair of rotary coupling means with axes of rotation transverse to, and respectively exposed to the outside of, said casing side walls; said camera body further having an exposed rotary coupling means at said second boundary surface thereof which is driven by said feed mechanism and which engages a different one of said rotary coupling means of said indicating device for the two mutually inverted positions of the magazine; and one of said rotary coupling means of said camera body and magazine being resilient and flexible permitting the engaging rotary coupling means to be separated upon relative pivotal movement between said hinged cover forming side wall and the rest of the casing.

2. The motion picture camera of claim 1 wherein each one of the rotary coupling means of said camera body and magazine includes a hollow member and the other of same has a plug-like shape which fits into and makes driving connection with said hollow member.

3. The motion picture camera of claim 2 wherein said hollow member has a cone-shaped opening and the coupling means which fits therein has a conical shape corresponding to the conical shape of the opening in said hollow member.

4. A motion picture camera comprising: a camera body including a feed mechanism including first coupling means for advancing film in an external film magazine and second coupling means for advancing an exposed film length indicating member mounted thereon, second coupling means moving over only a limited path while said first coupling means repeatedly traverses a given path during the complete exposure of a given length of film in the magazine, and film feed limit means which moves with the feeding of film in the magazine for stopping the movement of said first coupling means when it reaches a predetermined position indicating that a given length of film has been exposed, a film magazine attached to said camera housing and removable as a unit therefrom, said magazine including film supporting and feeding means coupled to said first coupling means when the film magazine is mounted on said camera housing, said magazine further having an exposed film length indicating member which is coupled to said second coupling means when the film magazine is in position on said camera body which member moves over a given path to indicate the point of the film last exposed as said first and second coupling means are driven by said feed mechanism, said exposed film length indicating member having a cam presenting a cam surface whose spacing from a given point of said camera body varies with the position of the indicating member, a follower member extending from said point of said camera body into engagement with said cam and connected to said movable film feed limit means to move the same into said predetermined position when said indicating member has moved to a position indicating the full exposure of said given length of film, wherein said magazine can be removed from the camera body at any time and be replaced on said camera after the intervening exposure of the film in another magazine without affecting the proper operation of said film feed limit means.

5. A motion picture camera comprising: a camera body for receiving a film magazine, said camera body including an optical system having an optical axis along which the light rays to be exposed are focused on the film in the magazine and feed mechanism for imparting movement to the film in the magazine; a film magazine removably attached to said camera body in either of two mutually inverted positions of said magazine, said magazine comprising a casing including a front film-receiving wall along which the section of film to be exposed passes and parallel side walls extending generally transverse to said front wall, one of said side walls being hinged to the rest of the casing to form a cover for the casing, and a pair of shafts extending transverse to said side walls for respectively rotatably supporting a supply reel and take-reel; said camera body further having a first boundary surface at right angles to said optical axis and which surface confronts said front film-receiving wall of said magazine casing, a second boundary surface extending substantially transverse to said first boundary surface and which confronts one of said side walls of said magazine, a picture gate at said first boundary surface which controls the exposure of the film on each of two component strips thereof spaced across the width of the film for said two positions of said magazine and coupling means at said second boundary surface driven by said feed mechanism for driving said shafts of said magazine; said side walls of said magazine having rotary coupling means which engage with said coupling means at said second boundary surfaces of said camera body for interconnecting the latter coupling means with a different one of said magazine shafts in the two mutually inverted positions of said magazine where the front film-receiving wall thereof is opposite said first boundary surface of said camera body, said magazine having an exposed film length indicating device driven by said second coupling means and including means for holding the position thereof when the magazine is removed from said camera body, a scale member supported for rotation about an axis extending transversely of said magazine side walls, said scale member having progressively increasing numbers thereon identifying the exposed film length for said respective component strips of the film in the two mutually inverted positions of the magazine, said scale member having at the opposite axial ends thereof cam faces respectively facing said second boundary surface of the camera body in said two mutually inverted positions of said magazine which cam faces present respective cam surfaces which are spaced varying amounts from said second boundary surface of said camera body as the scale member is rotated; said camera body having movable film feed locking means therein for preventing in a locking position thereof movement of said coupling means upon completion of exposure of each one of said component strips of the film, said locking means including a follower means at said second boundary surface of said camera body, which rides on the adjacent cam face of said scale member, said follower means being moved by the adjacent cam face of the magazine into a position which places said locking means in said locking position when said indicating member is in position which indicates the completion of the exposure of either one of said component strips.

6. A motion picture camera comprising: a camera body for receiving a film magazine, said camera body including an optical system having an optical axis along which the light rays to be exposed are focused on the film in the magazine and feed mechanism for imparting movement to the film in the magazine; a film magazine removably attached to said camera body in either of two mutually inverted positions of said magazine, said magazine comprising a casing including a front film-receiving wall along which the section of film to be exposed passes and parallel side walls extending generally transverse to said front wall, one of said side walls being hinged to the rest of the casing to form a cover for the casing, and a pair of shafts extending transverse to said side walls for respectively rotatably supporting a supply reel and take-reel; said camera body further having a first boundary surface at right angles to said optical axis and which surface confronts said front film-receiving wall of said magazine casing, a second boundary surface extending substantially transverse to said first boundary surface and which confronts one of said side walls of said magazine, a picture gate at said first boundary surface which controls the exposure of the film on each of two component strips thereof spaced across the width of the film for said two positions of said magazine and coupling means at said second boundary surface driven by said feed mechanism for driving said shafts of said magazine; said side walls of said magazine having rotary coupling means which engage with said coupling means at said second boundary surfaces of said camera body for interconnecting the latter coupling means with a different one of said magazine shafts in the two mutually inverted positions of said magazine where the front film-receiving wall thereof is opposite said first boundary surface of said camera body, said magazine having an exposed film length indicating device driven by said second coupling means and including means for holding the position thereof when the magazine is removed from said camera body, a scale member supported for rotation about an axis extending transversely of said magazine side walls and whose opposite axial ends are exposed through openings in said side walls, said scale member having progressively increasing numbers thereon identifying the exposed film length for said respective component strips of the film in the two mutually inverted positions of the magazine, said scale member having at the opposite axial ends thereof cam faces respectively facing said second boundary surface of the camera body in said two mutually inverted positions of said magazine which cam faces present respective cam surfaces which are spaced varying amounts from said second boundary surface of said camera body as the scale member is rotated; said camera body having movable film feed locking means therein for preventing in a locking position thereof movement of said coupling means upon completion of exposure of each one of said component strips of the film, said locking means including a spring urged pin extending through aligned openings in said second boundary surface of said camera body and the confronting side wall of said magazine which pin rides on the adjacent cam face of said scale member, said pin being moved by the adjacent cam face of the magazine into a position which places said locking means in said locking position when said indicating member is in position which indicates the completion of the exposure of either one of said component strips.

References Cited by the Examiner

UNITED STATES PATENTS

| | | | |
|---|---|---|---|
| 2,123,495 | 7/1938 | Becker | 352—78 |
| 2,143,756 | 1/1939 | Bouveng et al. | 352—76 |
| 2,505,231 | 4/1950 | Coutant et al. | 352—75 |

FOREIGN PATENTS

| | | |
|---|---|---|
| 1,172,231 | 10/1958 | France. |
| 658,644 | 4/1938 | Germany. |

NORTON ANSHER, *Primary Examiner.*

WILLIAM MISIEK, *Examiner.*